(12) United States Patent
Ter Steeg et al.

(10) Patent No.: US 9,649,961 B2
(45) Date of Patent: May 16, 2017

(54) COMPOSITE COMPONENT FOR A VEHICLE SEAT, AND VEHICLE SEAT

(71) Applicant: JOHNSON CONTROLS COMPONENTS GMBH & CO. KG, Kaiserslautern (DE)

(72) Inventors: Willem Jan Ter Steeg, Pulheim (DE); Lars Kramm, Trippstadt (DE); Jens Bold, Köln (DE); Georg-Ludwig Fischer, Winnweiler (DE); Harald Wolsiefer, Krickenbach (DE); Ulrich Riedel, Kuerten (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 14/913,116

(22) PCT Filed: Sep. 4, 2014

(86) PCT No.: PCT/EP2014/068860
§ 371 (c)(1),
(2) Date: Feb. 19, 2016

(87) PCT Pub. No.: WO2015/032869
PCT Pub. Date: Mar. 12, 2015

(65) Prior Publication Data
US 2016/0200231 A1    Jul. 14, 2016

(30) Foreign Application Priority Data

Sep. 5, 2013   (DE) .................. 10 2013 217 736
Nov. 21, 2013  (DE) .................. 10 2013 223 834

(51) Int. Cl.
A47C 7/02      (2006.01)
B60N 2/58      (2006.01)
(Continued)

(52) U.S. Cl.
CPC ............ *B60N 2/58* (2013.01); *B29C 67/0088* (2013.01); *B29C 70/68* (2013.01); *B29C 70/86* (2013.01);
(Continued)

(58) Field of Classification Search
CPC .......... B60N 2/22; B60N 2/682; B60N 2/686; B60N 2/58
(Continued)

(56) References Cited

U.S. PATENT DOCUMENTS 4,105,817 A   8/1978 Dunahoo
4,273,601 A   6/1981 Weingart
(Continued)

FOREIGN PATENT DOCUMENTS

DE   42 08 150 A1    9/1993
DE   601 09 255 T2   4/2006
(Continued)

*Primary Examiner* — Rodney B White
(74) *Attorney, Agent, or Firm* — McGlew and Tuttle, P.C.

(57) ABSTRACT

A composite component (110) for a vehicle seat (1), in particular for a motor vehicle seat, includes a plurality of fabric layers (116) of a fibrous material, a matrix material (118) securing the fabric layers (116), and an insert part (140), disposed between at least two of the fabric layers (116), for locally reinforcing the composite component. An insert strand (150) is disposed at least in sections along an edge or an edge surface (141.1) of the insert part (140). A vehicle seat (1) includes the composite component, in particular with a back structure (110) designed as a composite component.

18 Claims, 4 Drawing Sheets

(51) Int. Cl.
  *B29C 70/86*   (2006.01)
  *B32B 3/26*    (2006.01)
  *B32B 5/02*    (2006.01)
  *B32B 5/10*    (2006.01)
  *B32B 5/26*    (2006.01)
  *B32B 15/14*   (2006.01)
  *B32B 15/18*   (2006.01)
  *B29C 67/00*   (2017.01)
  *B60N 2/68*    (2006.01)
  *B29C 70/68*   (2006.01)
  *B60N 2/22*    (2006.01)
  *B29L 31/00*   (2006.01)
  *B29L 31/30*   (2006.01)

(52) U.S. Cl.
  CPC .............. *B32B 3/266* (2013.01); *B32B 5/024* (2013.01); *B32B 5/10* (2013.01); *B32B 5/26* (2013.01); *B32B 15/14* (2013.01); *B32B 15/18* (2013.01); *B60N 2/22* (2013.01); *B60N 2/68* (2013.01); *B60N 2/682* (2013.01); *B60N 2/686* (2013.01); *B29L 2031/3055* (2013.01); *B29L 2031/771* (2013.01); *B32B 2262/02* (2013.01); *B32B 2262/101* (2013.01); *B32B 2262/106* (2013.01); *B32B 2605/00* (2013.01)

(58) Field of Classification Search
  USPC .......................................... 297/452.18, 452.2
  See application file for complete search history.

(56) References Cited

U.S. PATENT DOCUMENTS

| | | | |
|---|---|---|---|
| 4,749,235 A | | 6/1988 | McDougall |
| 4,900,048 A | | 2/1990 | Derujinsky |
| 5,490,602 A | * | 2/1996 | Wilson .................... B29C 70/22 156/148 |
| 5,988,757 A | * | 11/1999 | Vishey ..................... B60N 2/23 297/452.18 |
| 6,059,369 A | * | 5/2000 | Bateson ................ B29C 70/222 297/452.18 |
| 6,423,388 B1 | * | 7/2002 | Bateson ................ B29C 70/222 297/452.2 |
| 2004/0198538 A1 | | 10/2004 | Goldsmith et al. |
| 2005/0062337 A1 | | 3/2005 | Meggiolan et al. |
| 2011/0084496 A1 | | 4/2011 | Kuroiwa |
| 2014/0232158 A1 | * | 8/2014 | Sano ........................ B60N 2/68 297/354.1 |
| 2014/0339873 A1 | * | 11/2014 | Cerruti ................. B60N 2/1615 297/344.13 |
| 2016/0096461 A1 | * | 4/2016 | Coppuck .............. B60N 2/4808 297/452.18 X |

FOREIGN PATENT DOCUMENTS

| | | |
|---|---|---|
| DE | 601 15 290 T2 | 7/2006 |
| DE | 20 2007 018 487 U1 | 10/2008 |
| DE | 10 2008 020 257 A1 | 11/2008 |
| DE | 10 2012 207 118 A1 | 10/2013 |
| EP | 0 105 741 A2 | 4/1984 |
| EP | 1 795 44 4 A2 | 6/2007 |
| WO | 2010/101874 A1 | 9/2010 |
| WO | 2011/029520 A2 | 3/2011 |
| WO | 2011/029522 A2 | 3/2011 |
| WO | 2012/169906 A1 | 12/2012 |
| WO | 2013/005308 A1 | 1/2013 |

* cited by examiner

US 9,649,961 B2

COMPOSITE COMPONENT FOR A VEHICLE SEAT, AND VEHICLE SEAT

CROSS REFERENCE TO RELATED APPLICATIONS

This application is a United States National Phase Application of International Application PCT/EP2014/068860 filed Sep. 4, 2014 and claims the benefit of priority under 35 U.S.C. §119 of German Patent Applications 10 2013 217 736.4 filed Sep. 5, 2013 and 10 2013 223 834.7 filed Nov. 21, 2013, the entire contents of which are incorporated herein by reference.

FIELD OF THE INVENTION

The invention relates to a composite component for a vehicle seat, in particular for a motor vehicle seat, comprising a plurality of woven fabric layers consisting of a fibrous material, a matrix material securing the woven fabric layers, and an insert part, which is arranged between at least two of the woven fabric layers, for locally reinforcing the composite component. The invention also relates to a vehicle seat, in particular a motor vehicle seat.

BACKGROUND OF THE INVENTION

The prior art discloses components for vehicle seats made of fiber composite materials, said components being constructed from individual woven fabric layers, which consist of fibrous material, and from a matrix material surrounding the fibrous material, and therefore the woven fabric layers are embedded in the matrix material. These components are also referred to as composite components. The production can be carried out, for example, in the form of a manual laminate or by a non automated resin transfer molding process (RTM).

The connection of a composite component, which is highly loadable by external forces, to an adjacent structure, for example the connection of a carbon backrest of a vehicle seat to a backrest inclination adjustment fitting, necessitates the local reinforcement of the composite component with a high strength insert part which is arranged between individual woven fabric layers and is therefore fixedly integrated in the composite component. The insert parts used are in particular steel sheet metal parts. Under high loading of the composite component, an undesirable "knife effect" may occur, in which the insert part cuts up and therefore destroys the composite component internally. The knife effect occurs in particular in the plane of the insert part and in a region located outside the region reinforced by the insert part. This effect can be only slightly reduced by the edges of the insert part being machined, in particular rendered harmless, in a complicated manufacturing step.

SUMMARY OF THE INVENTION

The invention addresses the problem, in a composite component, which is reinforced with an insert part, for a vehicle seat, of avoiding, or at least significantly reducing, the previously described knife effect, which is caused by the insert part. The solution is also intended to make it possible for the composite component to be able to be produced by automated manufacturing, in particular in the RTM process. The composite component is intended to be suitable in particular for use in a vehicle seat and is intended to increase the strength and crash safety of a vehicle seat by the use of such a composite component.

This problem is solved according to the invention by a composite component for a vehicle seat, in particular for a motor vehicle seat, comprising a plurality of woven fabric layers consisting of a fibrous material, a matrix material securing the woven fabric layers, and an insert part, which is arranged between the woven fabric layers, for locally reinforcing the composite component, wherein an insert strand is arranged at least in sections along an edge or an edge surface of the insert part.

An insert part arranged between at least two of the woven fabric layers is preferably located between precisely two woven fabric layers, which are arranged next to each other, of a multiplicity of woven fabric layers. However, individual woven fabric layers may also overlap in the region of the insert part on one side of the insert part, and therefore the insert part can be arranged between a plurality of woven fabric layers. The number of woven fabric layers lying one above another on a side of the insert part in each case is not relevant to the invention and in this respect is not limited.

Owing to the fact that an insert strand is arranged at least in sections along an edge or an edge surface of the insert part, the edge or the edge surface is covered by the insert strand. As a result, direct contact between the sharp edge or edge surface and the adjacent woven fabric layers and the adjacent matrix material of the composite component can be avoided and therefore a knife effect within the composite component can also be avoided. Furthermore, a limited displacement of the insert part within the composite component can be compensated for without loading or destroying the bond of the composite component.

The insert part is advantageously formed flat, for example is cut out of a metal sheet. A flat insert part can easily be arranged between individual woven fabric layers of the composite component. In regions around the insert part, the woven fabric layers, between which the insert part is located, bear against one another and are secured with respect to one another by matrix material. A surface side of the insert part is preferably covered by a first layer of woven fabric layers and matrix material, and a further surface side of the insert part is covered by a second layer of woven fabric layers and matrix material.

The first layer and the second layer are connected to each other by means of matrix material in addition to the insert part.

The insert part can have an interface for the connection of the composite component to an adjacent component, for example a threaded bushing with an internal thread for the screwing on of an additional component. In order to ensure direct accessibility of the interface, it is of advantage if the insert part is not covered locally by woven fabric layers and matrix material, for example in the region of a thread.

The term insert strands should be understood as meaning elongate profiles, in particular with a constant cross section, as can be produced, for example, by extrusion. However, the invention can basically also be carried out with insert strands, the cross sections of which change along the strand profile.

The term edge surface should be understood as meaning in particular a surface defined in height by the sheet metal thickness of the insert part, while an edge is a line, in particular on an edge surface.

In a transition region between the insert part and a monolithic region consisting of woven fabric layers and matrix material, a cross sectionally triangular, in particular wedge shaped region without woven fabric layers is formed because of minimally permissible bending radii of the woven fabric layers. Said region is preferably substantially filled with the insert strand. However, the profile shape of the insert strand is not necessarily predetermined by the minimally permissible bending radii of the woven fabric layers, but rather can be selected freely and can be adapted to the load situations and the matrix and fibrous materials used.

The cross section of the insert strand is preferably approximately triangular or wedge shaped. The corners of the cross section of the insert strand are preferably rounded here. As a result, a continuous, gentle transition takes place between the monolithic composite component region and the sandwich construction (composite-insert-composite), said transition optimally controlling the force flux within the actual woven fabric layers.

The material of the insert strand preferably has a lower strength and/or a lower hardness in comparison to the woven fabric fibers. An insert strand consisting of glass fibers is advantageously inserted in a carbon component.

A particularly cost effective insert strand is designed as a rubber band or plastics band.

The insert part is preferably a punched part, in particular made of steel, which is produced cost effectively by means of a punching tool. A burr possibly arising during the punching does not have to be removed since said burr cannot damage the composite component internally because of the insert strand.

By the composite component being designed as a backrest structure for a vehicle seat or as a component of a backrest structure for a vehicle seat, and comprising an insert part for connecting the backrest structure to a fitting, it is possible to provide high strength backrest structures, via the connecting points of which to the fittings high forces and torques can be conducted. The fittings used are preferably latching fittings, as known, for example, from WO 2011/029522 A2, or geared fittings, as known, for example, from WO 2011/029520 A2.

The outer component contour of the composite component is formed at least in sections by a woven fabric strand embedded in the matrix material. A retrospective trimming of the component contour can thereby be dispensed with.

For the connection to the woven fabric layers, the woven fabric strand is embedded in the matrix material and is therefore at least partially surrounded by matrix material. The term embedded should be understood as meaning a complete or a partial encasing of the woven fabric strand woven fabric with matrix material or a complete penetration or partial penetration of the woven fabric with matrix material, and any combination thereof.

The woven fabric strand is preferably designed as a woven fabric tube or a braided tube. The braided tube differs from the woven fabric tube in that the fibers are not supplied at right angles during the braiding of the braided tube. Alternatively, the woven fabric strand is designed as a woven fabric band or a flexible cord, i.e. a substantially flat, in particular two dimensional braid. Woven fabric tubes and braided tubes or woven fabric bands and flexible cords which are known per se and are available cost effectively can be used as the woven fabric strand, which reduces the component costs. The term woven fabric strand should be understood as meaning a collective term for woven fabrics and braids which are formed in an elongate manner and are known per se, irrespective of angular positions of the fibers with respect to one another or absolutely.

The composite component comprises ready premanufactured woven fabric layers. During the production process, in particular the woven fabric layers and a braided tube are positioned in a mold, preferably by a robot. However, in the event of low piece numbers, the positioning may also take place manually.

The problem is also solved by a vehicle seat comprising a composite component according to the invention. A vehicle seat of this type provides high strength and high rigidity at a low weight.

The invention is explained in more detail below with reference to an advantageous exemplary embodiment which is illustrated in the figures. However, the invention is not restricted to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
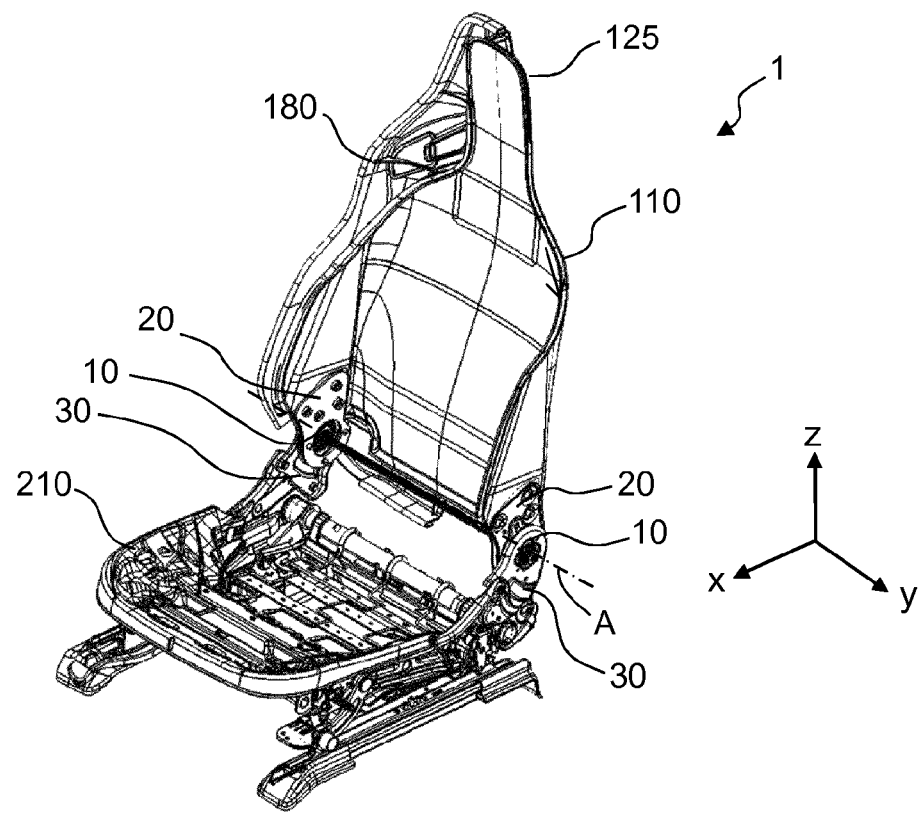
FIG. 1 is a perspective view of an un upholstered vehicle seat with a backrest according to the exemplary embodiment.

A vehicle seat 1, designed in the present case as a sporty seat, for a motor vehicle has a backrest and a seat underframe. The backrest and the seat underframe are connected to each other by means of two fittings 10 which are known per se. For this purpose, each of the two fittings 10 has a fitting upper part 20, which is connected to a backrest structure 110, which is in the form of a composite component, of the backrest, and a fitting lower part 30, which is connected to a seat underframe structure 210 of the seat underframe. The fitting upper part 20 and the fitting lower part 30 are adjustable relative to each other via a fitting mechanism which is known per se, for example a latching fitting or a geared fitting, and therefore the inclination of the backrest structure 110 about a backrest pivot axis A can be set.

The vehicle seat 1, which is illustrated un upholstered in FIG. 1, is described below using three spatial directions which are perpendicular to one another. With a vehicle seat 1 installed in the vehicle, a longitudinal direction x runs substantially horizontally and preferably parallel to a longitudinal direction of the vehicle, which corresponds to the customary direction of travel of the vehicle. A transverse direction y running perpendicularly to the longitudinal direction x is likewise oriented horizontally in the vehicle and runs parallel to a transverse direction of the vehicle. A vertical direction z runs perpendicularly to the longitudinal direction x and perpendicularly to the transverse direction y.

With a vehicle seat 1 installed in the vehicle, the vertical direction z runs parallel to the vertical axis of the vehicle.

The position and direction details used, for example at the front, at the rear, at the top and at the bottom, relate to a viewing direction of an occupant sitting in the vehicle seat 1 in a normal seat position, wherein the vehicle seat 1 installed in the vehicle is oriented in a use position, which is suitable for conveying individuals, with an upright backrest and as customary in the direction of travel. However, the vehicle seat 1 according to the invention can also be installed in a differing orientation, for example transversally with respect to the direction of travel.

Figure 2:
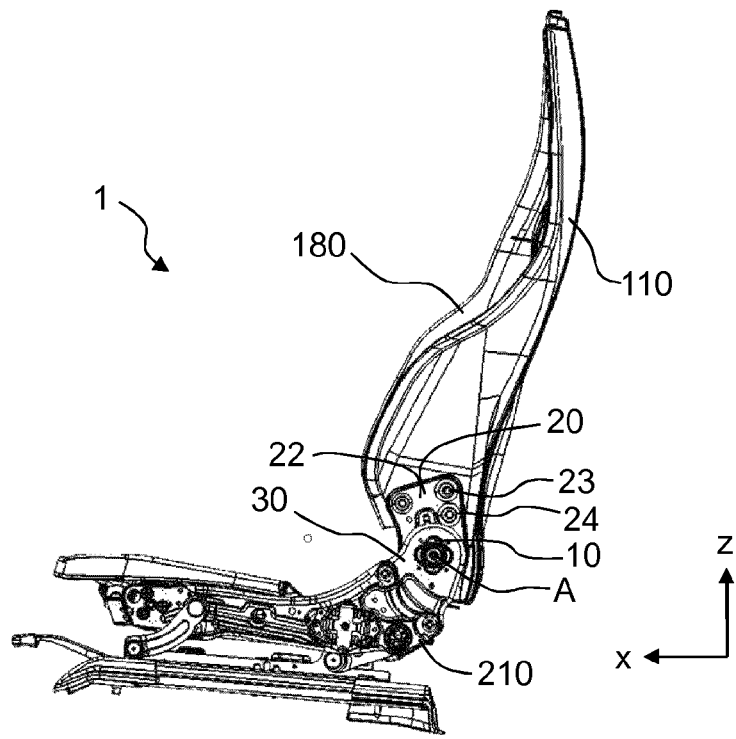
FIG. 2 is a side view of the un upholstered vehicle seat from FIG. 1.
Figure 3:
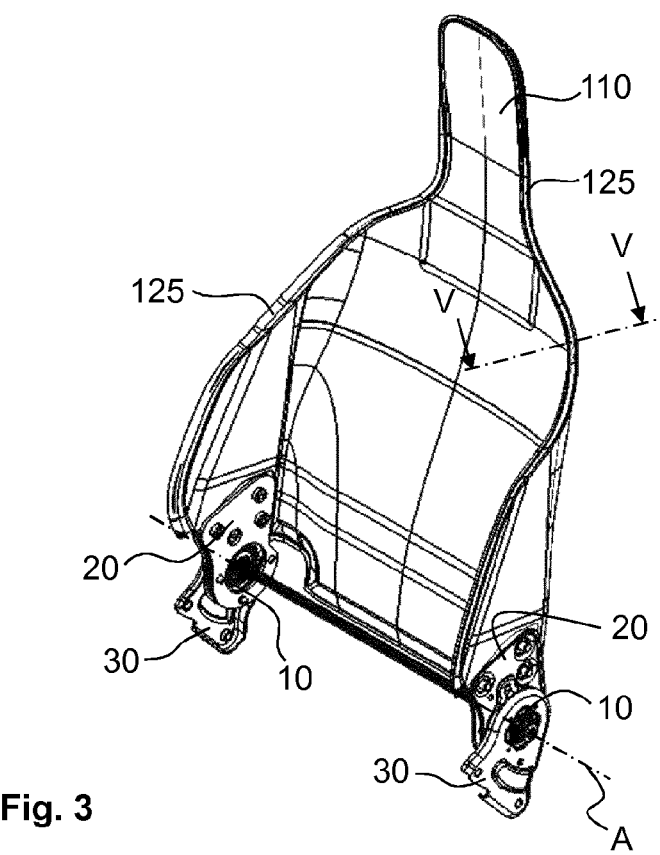
FIG. 3 is a perspective view of the backrest from FIG. 1.
Figure 4:
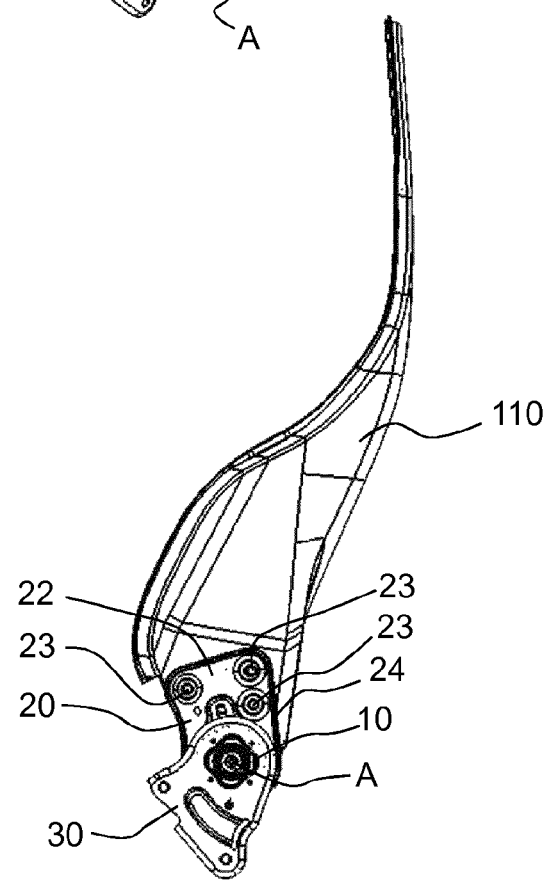
FIG. 4 is a side view of the backrest from FIG. 1.

The backrest structure 110 is covered laterally and from the rear with a design shell 180 which is illustrated in half section in FIGS. 1 and 2. In the case of an upholstered vehicle seat 1, a foam part (not illustrated in the Figures) is arranged on the front side of the backrest structure 110. The foam part is covered with a cover (likewise not illustrated in the Figures), the outer edge contours of which are fastened to the design shell 180 or alternatively to the backrest structure 110 such that the cover and the design shell 180 accommodate the backrest structure 110 and the foam part between each other. In a modification of the exemplary embodiment, the design shell 180 is omitted and the rear side of the backrest structure 110 forms the rearmost visible surface of the backrest.

The design shell 180 and the cover define the outer design of the backrest without substantially contributing to the strength of the backrest. In the present case, the design shell 180 is an injection molded part composed of a plastic which is known per se. The cover is preferably substantially composed of material and/or leather.

The backrest structure 110 is a load bearing structural part of the vehicle seat 1. The forces, in particular crash forces, acting on the backrest are substantially absorbed by the backrest structure 110 and transmitted via the fittings 10 into the seat underframe structure 210.

The backrest structure 110 is a composite component and has a shell construction composed of a composite material. In the present case, the backrest structure 110 comprises a bond composed of a resin, in particular an epoxy resin, as matrix material 118 and a multiplicity of carbon fibers reinforcing the matrix material 118.

The carbon fibers are arranged in a plurality of woven fabric layers 116, wherein each of the woven fabric layers 116 is a three dimensionally shaped fabric, in particular a multi axial fabric, in which the carbon fibers are arranged in different directions from one another and form a woven fabric. In a modification of the exemplary embodiment, the fibers are arranged unidirectionally or a laid scrim is used.

The woven fabric layers 116 are surrounded and penetrated by the matrix material 118 by the backrest structure 110 being produced, for example, by means of a resin transfer molding process (RTM) or another method known per se for producing carbon fiber reinforced plastic components.

Figure 5:
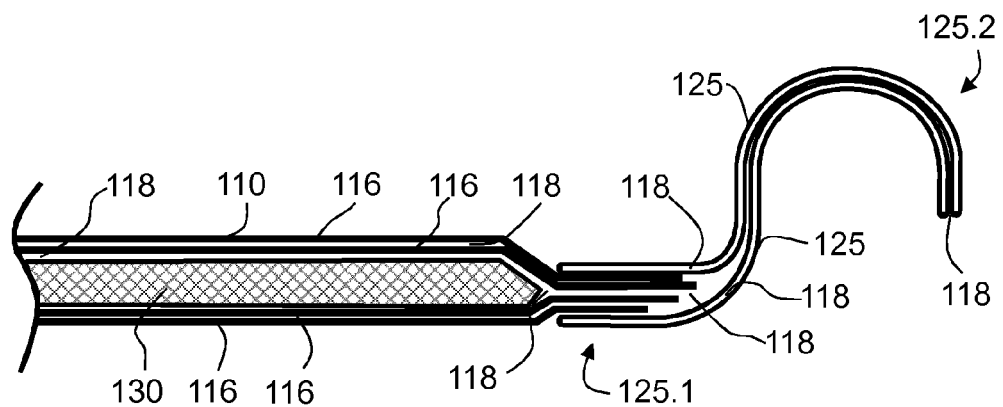
FIG. 5 is a sectional view along the line V V in FIG. 3.
Figure 6:
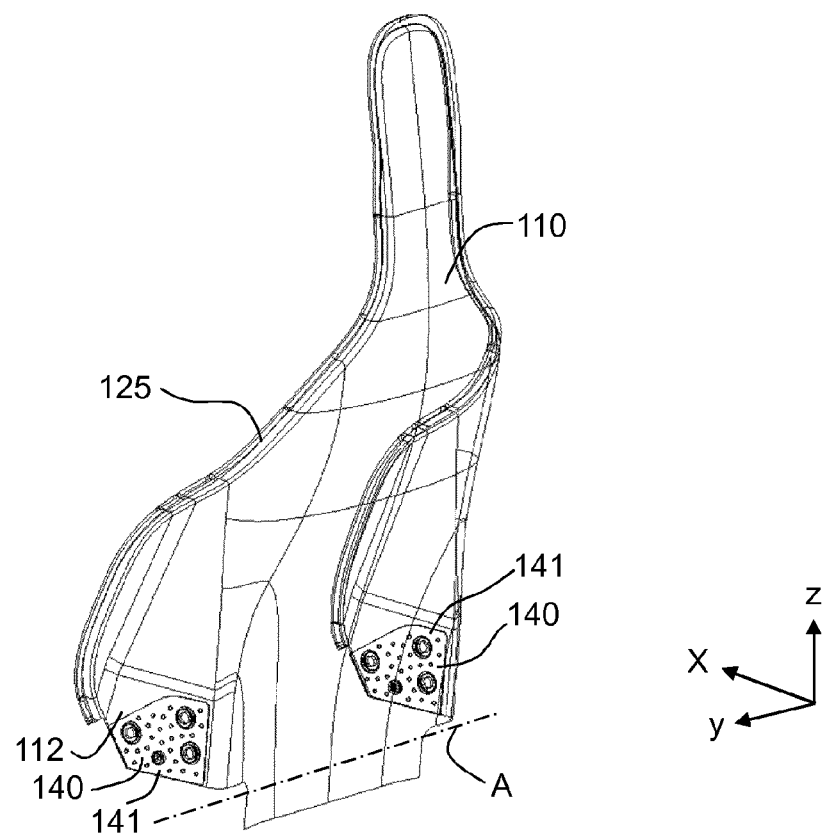
FIG. 6 is a perspective rear view of the backrest from FIG. 1.
Figure 7:
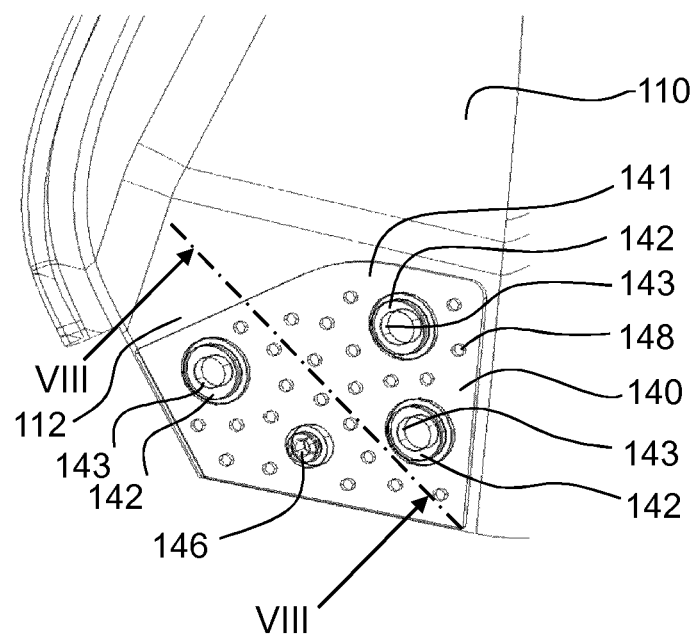
FIG. 7 is a detailed view from FIG. 6.

Between individual woven fabric layers 116, a core 130 or, alternatively, a plurality of cores 130 is or are arranged in sections over wide regions of the backrest structure 110. FIG. 5 shows a section through the backrest structure 110 in a region having a core 130. The core 130 is arranged between two approximately identically thick layers of in each case a plurality of woven fabric layers 116 surrounded by matrix material 118. This results in a sandwich construction of the core 130 and the composite material composed of woven fabric layers 116 and matrix material 118.

The core 130 consists of a rigid foam or, alternatively, of a soft foam, for example of PVC foam, and serves for energy absorption, for example in the event of an accident.

The outer encircling edge region of the backrest structure 110 is formed in sections by two flat, but three dimensionally shaped braided tubes 125 which are embedded in matrix material 118 and run along the outer contour of the backrest structure 110. Flat in the present case means that each braided tube 125 has only a very small inner cavity, if any at all. Each of the two braided tubes 125 is pressed together from a tube having, for example, an originally round cross section such that—as can be seen in FIG. 5—the cross section of each of the two braided tubes 125 has a tube section which, in the length thereof, corresponds approximately to half of the inner circumference of the cross section of the braided tube 125 and lies very closely opposite the remaining tube section or bears there against. The possibly present small cavity is filled in the present case and preferably with matrix material 118.

Each of the two braided tubes 125 is composed of a carbon fiber woven fabric, in the present case with a +/−45° fiber orientation.

The cross section of the two flat braided tubes 125 is in each case approximately S shaped. The two braided tubes 125 are adjacent to each other and oriented in a substantially identical position to each other. In a first end region 125.1 of the cross section of the two braided tubes 125, which end region is oriented in the direction of the center of the backrest structure 110, the two braided tubes 125 accommodate the outer edges of the individual woven fabric layers 116 between each other. As a result, the tubes overlap the outer edges of the woven fabric layers 116. The outer edges of the individual woven fabric layers 116 and the two braided tubes 125 are connected to each other in the first end region 125.1 by means of the matrix material 118.

In a second end region 125.2 of the cross section of the two braided tubes 125, which end region lies opposite the first end region 125.1 and defines the outer edge of the backrest structure 110, the contours of the braided tubes 125 lie directly one inside the other and are surrounded and secured with respect to each other by matrix material 118.

Tolerances in the trimming and in the orientation of the individual woven fabric layers 116 are compensated for by the described overlapping arrangement of the braided tubes 125 with respect to the outer edges of the individual woven fabric layers 116 such that the outer contour of the backrest structure 110 is untrimmed, but nevertheless has a smooth and continuous contour profile by means of the braided tubes 125.

In a modification of the exemplary embodiment, just one braided tube 125 in sections forms the outer, encircling edge region of the backrest structure 110. The woven fabric layers 116 overlap the tube in sections, but not as far as the outer contour of the backrest structure 110.

In a further modification of the exemplary embodiment, a flat woven fabric band in sections forms the outer, encircling edge region of the backrest structure 110. Two woven fabric bands which correspondingly accommodate the edges of the woven fabric layers 116 between each other are also conceivable.

The backrest structure 110 is substantially mirror symmetrical to a plane running parallel to the longitudinal direction x and parallel to the vertical direction z through the seat center.

The backrest structure 110 comprises, as seen in the transverse direction y, in the two outer regions a connecting surface 112, which is of substantially flat design, for the connection in each case of one of the two fitting upper parts 20. The two connecting surfaces 112 run perpendicularly to the backrest pivot axis A and therefore parallel to the longitudinal direction x and to the vertical direction z.

In the Figures, the two connecting surfaces 112 are illustrated in transparent form, and therefore an insert part 140 which is incorporated in the regions of the connecting surfaces 112 of the backrest structure 110 is visible in each case although said insert part, as is described in more detail below, is surrounded by woven fabric layers 116 and matrix material 118. The fitting upper parts 20 which are partially concealed by the backrest structure 110 are also visible in the Figures because of the transparent manner of illustration.

The two insert parts 140 and the two connecting surfaces 112 are constructed symmetrically with respect to one another with respect to a mirror plane running in the longitudinal direction x and in the vertical direction z through the seat center, and therefore only one side of the backrest structure 110 is described below.

The insert part 140 is composed of steel sheet, in particular stainless steel sheet or a steel sheet with an anti-corrosion coating, and comprises a substantially flat plate 141. Three threaded bushings 142 with an internal thread 143 are welded into the plate 141. The center lines of the internal threads 143 are oriented in the transverse direction y. In the region of the internal threads 143, the insert part 140 is not covered by woven fabric layers 116 or matrix material 118.

A centering bore 146 serves for orienting the insert part 140 in a mold during the production of the backrest structure 110, in particular also for orienting same with respect to the opposite insert part 140, as seen in the transverse direction y. Alternatively to the centering bore 146 or additionally thereto, a threaded bushing for the screwing on of an additional component, for example an electric motor for driving the fittings 10, can also be provided.

In addition, the plate 141 comprises a plurality of passages 148, in the present case circular holes with a respective center axis parallel to the transverse direction y and with a diameter which is smaller than the diameter of the internal threads 143. The passages 148 permit viscous matrix material 118 to pass therethrough during the production process of the backrest structure 110.

Figure 8:
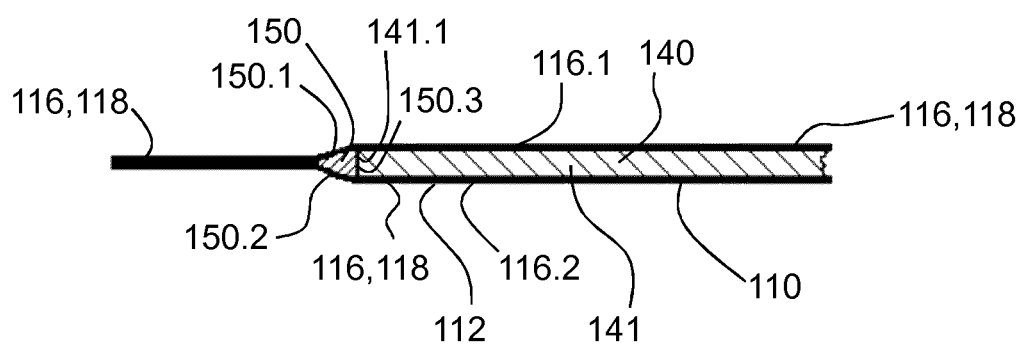
FIG. 8 is a sectional view along the line VIII VIII in FIG. 7.

FIG. 8 illustrates a section through the backrest structure 110 in the region of the insert part 140. One of the two surface sides of the insert part 140 is covered by a first layer 116.1 of woven fabric layers 116 and matrix material 118, the other surface side of the insert part 140 is covered by a second layer 116.2 of woven fabric layers 116 and matrix material 118. At a small distance from an edge surface 141.1 of the plate 141, the first layer 116.1 and the second layer 116.2 converge outside the region of the plate 141 and monolithically form there a uniform bond of woven fabric layers 116 and matrix material 118.

In the transition region between the plate 141 and the monolithic region of woven fabric layers 116 and matrix material 118, a cross sectionally triangular, in particular wedge shaped region which does not have woven fabric layers 116 and is filled with a triangular, in particular wedge shaped insert strand 150, is formed because of minimally permissible bending radii of the woven fabric layers 116. The insert strand 150 comprises a first side 150.1, a second side 150.2 and a third side 150.3. In the transition region between the plate 141 and the monolithic region, the first side 150.1 bears against the first layer 116.1, and the second side 150.2 bears against the second layer 116.2. A third side 150.3 of the insert strand 150 bears against the encircling edge surface 141.1 of the insert part 140, which edge surface is defined by the sheet metal thickness of the plate 141.

In the present case, the insert strand 150 is a glass fiber strand encircling the outer contour of the insert part 140, and, by means of the wedge shape thereof, brings about a continuous, gentle transition between the monolithic component region and the sandwich construction consisting of the insert part 140 and the woven fabric layers 116, which surround the insert part 140, in particular on both sides, and the matrix material 118.

In a modification of the exemplary embodiment, the insert strand 150 can also be configured as a rubber band.

In the present case, the second fitting upper part 20 is manufactured from steel sheet and has a flat basic body 22 which runs substantially parallel to the longitudinal direction x and to the vertical direction z and bears against the connecting surface 112. Three through holes 23 are aligned with the three internal threads 143 of the insert part 140, and therefore the fitting 10 can be screwed at these points to the backrest structure 110. The three threaded bushings 142 end flush with the connecting surface 112 or project slightly over the latter, and therefore the basic body 22 of the fitting upper part 20 bears directly against the end surfaces of the threaded bushings 142. This avoids damage to the matrix material 118 and/or to the woven fabric layers 116.

In a modification of the exemplary embodiment, the connecting surface 112 is slightly inclined in relation to a plane running perpendicularly to the backrest pivot axis A, preferably by 1 to 5°. The basic body 22 of the fitting upper part 20 runs correspondingly obliquely.

In a further modification of the exemplary embodiment, instead of the three threaded bushings 142, three bushings without an internal thread are provided as through bushings, and the three through holes 23 are replaced by three internal threads. The screw connection takes place in this case from the direction of the seat center.

Along the outer edge of the basic body 22, the fitting upper part 20 has a flange 24 which runs perpendicularly to the basic body 22 and is oriented toward the outer side of the vehicle seat 1.

The features disclosed in the above description, the claims and the drawings may be of significance both individually and in combination for realizing the invention in the various refinements thereof.

While specific embodiments of the invention have been shown and described in detail to illustrate the application of the principles of the invention, it will be understood that the invention may be embodied otherwise without departing from such principles.

The invention claimed is:

1. A composite component for a motor vehicle seat, the composite component comprising:
   a plurality of woven fabric layers formed of a fibrous material;
   a matrix material securing the woven fabric layers;
   an insert part arranged between at least two of the woven fabric layers, for locally reinforcing the composite component; and
   an insert strand arranged at least in sections along an edge or an edge surface of the insert part, wherein a surface side of the insert part is covered by a first layer of the woven fabric layers and matrix material, and a further surface side of the insert part is covered by a second layer of the woven fabric layers and matrix material.

2. The composite component as claimed in claim 1, wherein the insert part is not covered by the woven fabric layers and matrix material in a not covered region.

3. The composite component as claimed in claim 2, wherein the insert part has at least one threaded bushing with an internal thread for the screwing on of an additional component, and the not covered region, at which the insert part is not covered by woven fabric layers and matrix material, is a region of the threaded busing.

4. The composite component as claimed in claim 1, wherein the insert strand is an elongate profile.

5. The composite component as claimed in claim 4, wherein the insert strand has a constant cross section over an entire profile length.

6. The composite component as claimed in claim 1, wherein the cross section of the insert strand is approximately triangular wedge shaped.

7. The composite component as claimed in claim 1, wherein a cross section of the insert strand has rounded corners.

8. The composite component as claimed in claim 1, wherein material of the insert strand has a lower strength than material of the woven fabric layers or than the matrix material or than both the material of the woven fabric layers and the matrix material.

9. The composite component as claimed in claim 1, wherein the insert strand comprises glass fibers and the woven fabric layers comprise carbon.

10. The composite component as claimed in claim 1, wherein the insert strand is a rubber band or a plastics band.

11. The composite component as claimed in claim 1, wherein the insert part is formed as a punched part made of metal.

12. The composite component as claimed in claim 11, wherein the insert part is formed from steel.

13. The composite component as claimed in claim 1, wherein the composite component is configured as a backrest structure for a vehicle seat or as part of a backrest structure for a vehicle seat and the insert part connects the backrest structure to a fitting.

14. A motor vehicle seat comprising a composite component of a backrest structure the composite component comprising:

a plurality of woven fabric layers formed of a fibrous material;

a matrix material securing the woven fabric layers;

an insert part arranged between at least two of the woven fabric layers, for locally reinforcing the composite component; and an insert strand arranged at least in sections along an edge or an edge surface of the insert part, wherein the insert part has at least one threaded bushing with an internal thread for screwing on of an additional component, and a not covered region, at which the insert part is not covered by woven fabric layers and matrix material, is a region of the threaded bushing.

15. The vehicle seat according to claim 14, wherein a surface side of the insert part is covered by a first layer of the woven fabric layers and matrix material, and a further surface side of the insert part is covered by a second layer of the woven fabric layers and matrix material.

16. The vehicle seat according to claim 14, wherein:

the insert strand is an elongate profile with an essentially constant cross section over an entire profile length; and the insert part is formed as a punched part made of metal.

17. The vehicle seat according to claim 14, further comprising a fitting, wherein the insert part connects the backrest structure to the fitting.

18. A composite component for a motor vehicle seat, the composite component comprising:

a plurality of woven fabric layers formed of a fibrous material;

a matrix material securing the woven fabric layers;

an insert part arranged between at least two if the woven fabrics layers, for locally reinforcing the composite component; and an insert strand arranged at least in sections along an edge or an edge of the insert part, wherein material of the insert strand has a lower strength than material of the woven fabric layers or than the matrix material or than both the material of the woven fabric layers and the matrix material.

* * * * *